Patented June 14, 1949

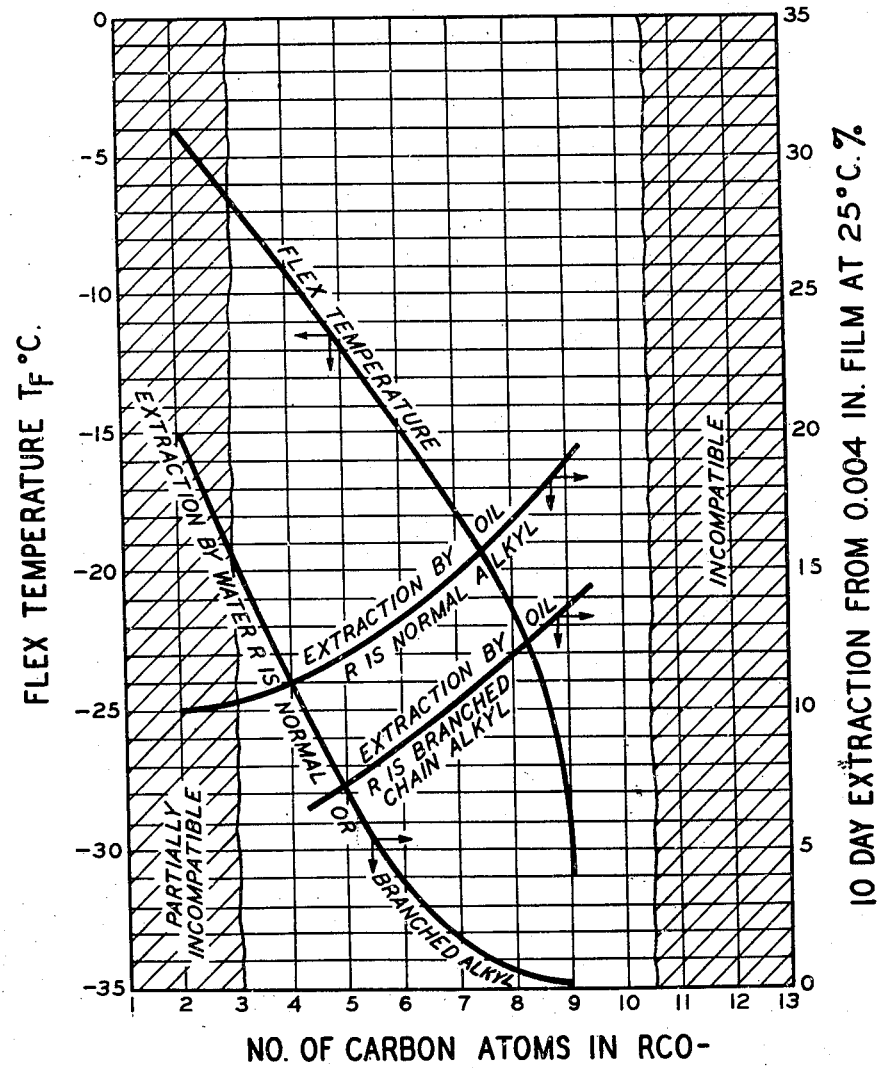
PROPERTIES OF VINYL CHLORIDE-VINYL ACETATE COPOLYMERS PLASTICIZED WITH COMPOUNDS
$$RCO-N \begin{matrix} C_2H_4OOCR \\ C_2H_4OOCR \end{matrix}$$

2,472,900

UNITED STATES PATENT OFFICE 2,472,900

VINYL CHLORIDE RESINS PLASTICIZED WITH DIESTER-AMIDES

Franklin Johnston and William H. Hensley, St. Albans, W. Va., assignors to Carbide and Carbon Chemicals Corporation, a corporation of New York Original application May 1, 1946, Serial No. 666,439. Divided and this application August 27, 1947, Serial No. 770,884

5 Claims. (Cl. 260—31.2)

The expanding use of vinyl chloride resins has created a need for better plasticizers to be incorporated with such materials. Plasticizers are required, for instance, to reduce the molding temperature of vinyl chloride resins, and to increase the flexibility of films, which may be calendered, cast, or deposited from lacquers. Also, plasticizers are incorporated in rather large amount with certain vinyl chloride resins to form resilient elastomeric compositions which have a host of applications. There are many properties which are desired in plasticizers; they should have extensive compatibility or solvating power for a wide range of synthetic resins, they should resist extraction by oils or water, and they should not exude or "sweat-out" from plastic compositions nor should they gradually volatilize or migrate to other objects in contact with the plastic compositions. It is also important that plasticizers be stable at elevated temperature so that they do not release noxious fumes during compounding on the mill. In addition plasticizers should be non-toxic, non-corrosive, and free from objectionable odor. Furthermore, plasticizers should retain their effectiveness as low temperatures so that plasticized compositions do not become brittle in frigid weather.

To date, to our knowledge, no organic chemist has succeeded in making an "ideal" plasticizer for vinyl chloride resins, which is perfect in all respects, nor do we claim to have done this, but we have succeeded in developing a class of compounds which have outstanding utility as plasticizers for vinyl chloride resins, and which are superior in many respects to presently used materials. Our compounds are diester amides represented by the formula

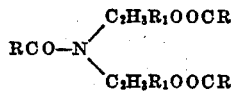

where R is an alkyl radical containing from 2 to 8 carbon atoms inclusive and $R_1$ is hydrogen or methyl. These compounds may be prepared by heating one mol of diethanolamine, diisopropanolamine, or N-hydroxyethyl, N-hydroxyisopropyl amine with at least three moles of a fatty acid containing from 3 to 9 carbon atoms. The resulting diester-amides are stable high-boiling liquids which are non-basic and which do not form salts. Likewise they are water-insoluble and contain no hydrophylic groups, so that they are not dispersing agents. Thus, they are to be distinguished from the many types of dispersing agents which have been prepared from alkylolamines and higher fatty acids, such as lauric and stearic acids.

One of the outstanding properties of the new compounds is their effectiveness as plasticizers for copolymers of vinyl chloride and vinyl acetate. In this respect, it has been found that the number of carbon atoms in the radical RCO— is of vital significance as shown in the drawing. This drawing shows how the properties of vinyl chloride-vinyl acetate copolymers plasticized with diester-amides of diethanolamine vary with the number of carbon atoms in the acyl radical RCO—. The percentage of plasticizer is chosen so that the elongation of a test piece under a load of 1,000 lbs. per sq. in. at 25° C. (applied at a constant rate in 74 seconds) is 100%. When the acyl radical is acetyl, the compound is only partially compatible with vinyl chloride-vinyl acetate copolymers. By "partial compatibility" is meant that the compound can be mixed with the resin on a heated rubber mill to yield a flexible product, but the compound exudes or "sweats out" from the plasticized composition on standing for a few days. On the other hand, when RCO— is the lauric acid radical, $C_{11}H_{23}CO$—, the compound is incompatible with the vinyl chloride-vinyl acetate copolymers and "sweats-out" immediately from the plastic compositions.

It has been definitely determined that the compounds are permanently compatible with vinyl chloride-vinyl acetate copolymers when the acyl radical, RCO—, contains from 3 to 9 carbon atoms. Within this range, the low temperature flexibility of the plasticized compositions increases as the number of carbon atoms in the acyl radical increases, as shown in the drawing of Flex Temperature vs. No. of Carbon Atoms in RCO—. The flex temperature is a measure of pliability and is defined as the temperature which yields an apparent modulus of elasticity of 135,000 lbs. per sq. in. according to the work of Clash and Berg. Ind. Eng. Chem. 34, 1218 (1942). The extraction of plasticizer by water decreases markedly as the number of carbon atoms in the acyl radical increases, while the extraction by mineral oil increases somewhat. The extraction of plasticizer by oils is also dependent on the molecular configuration of the alkyl radical in RCO—. For the same number of carbon atoms in the alkyl radical, the percentage extraction by oil is less when R is a branched-chain alkyl radical than when R is normal alkyl.

Our preferred plasticizer is the diester-amide prepared from diethanolamine and 2-ethylhexanoic acid, having the chemical name, 2,2'(2-ethylhexanamido)diethyl di(2-ethylhexanoate) hereafter referred to, for convenience, as the 2-ethylhexyl diester-amide. This compound has a high degree of compatibility with copolymers of vinyl chloride and vinyl acetate and may serve as a coupling agent so that less compatible modifying materials may be included in compositions containing these copolymers. The 2-ethylhexyl diester-amide may be mixed more rapidly with copolymers of vinyl chloride and vinyl acetate on a heated rubber mill at temperatures of 140 to 160° C. than is the case with other materials, so that production costs are decreased and the heat sensitive copolymers are subjected to elevated temperatures for shorter periods. The proportion of plasticizers which may thus be incorporated may vary from about 10% to about 50% of the composition, (resin plus plasticizer), and the resulting products vary from flexible films to resilient elastomeric sheet material, depending on proportion of plasticizer.

In addition to being suitable in solid milled compositions, the 2-ethylhexyl diester-amide has proven to be very useful in the preparation of liquid dispersions or pastes from emulsion polymerized vinyl chloride resins. These dispersions or pastes are prepared by grinding the emulsion polymerized resins with the plasticizer, with or without the addition of mixtures of hydrocarbon diluents and ketone solvents having controlled swelling action in the resin, in a ball-mill or like apparatus. If the plasticizer alone is employed as the dispersing medium, about 40 to 60% of the plasticizer by weight of the composition is required, whereas if the said mixtures are included, the proportions of plasticizer may be adjusted to that required for the desired flexibility of the final product. These dispersions or pastes may be subjected, while fluid, to a forming process, as by casting or molding, and then set in the desired form by the application of heat and cooling. During heating, the volatile mixtures of hydrocarbons and solvents, if used, are driven off; but the plasticizer is retained and unintentional losses thereof are to be avoided. The 2-ethylhexyl diester-amide has a low vapor pressure and is not driven off during such fusing operations. For instance, the vapor pressure of the 2-ethylhexyl diester-amide at 200° C. is 0.6 mm. Hg, whereas the vapor pressure of di(2-ethylhexyl) phthalate, a plasticizer which is currently used in such dispersions, is 1.35 mm. Hg at 200° C. In addition to its low volatility, the 2-ethylhexyl diester-amide has the proper ratio of solvent power for the vinyl chloride resins at room temperatures and at elevated temperatures, as well as a high degree of wetting action for the resin particles, to serve as an efficient plasticizer in the making of such dispersions or pastes.

Comparative tests have been carried out showing that the 2-ethylhexyl diester-amide is superior in most respects to two standard compounds, tricresyl phosphate and di(2-ethylhexyl) phthalate as a plasticizer for vinyl chloride resins. The tests were performed using a commercial grade of a copolymer of vinyl chloride and vinyl acetate containing about 96% vinyl chloride, and having an average molecular weight of about 23,000 to 24,000, according to the method reported by Douglas and Stoops, Ind. & Eng. Chem. 28 1152 (1936), commercial grades of the two reference plasticizers, and a highly refined sample of the 2-ethylhexyl diester-amide. The results of the tests were as follows:

| Plasticizer | Per Cent By Wt.[1] | Elongation per cent at— | | | Per Cent Loss in 10 days from 0.004 in film in— | | | Flex. Temp., °C. |
|---|---|---|---|---|---|---|---|---|
| | | 10° C. | 25° C. | 40° C. | Air at 60° C. | Water at 25° C. | Oil at 25° C. | |
| Tricresyl phosphate | 35.3 | 20 | 100 | 218 | 0.5 | 1.0 | 1.5 | +4.2 |
| Di (2-ethylhexyl) phthalate | 33.5 | 47 | 100 | 187 | 0.7 | 0.3 | 8.2 | −16.0 |
| 2-Ethylhexyl diester-amide | 35.0 | 55 | 100 | 165 | 0.3 | 0.1 | 10.3 | −23.0 |

[1] The percentage of plasticizer is chosen so that the elongation of a test piece under a load of 1,000 lbs. per sq. in. at 25° C. (applied at a constant rate in 74 seconds) is 100 per cent.

It will be observed that the compositions containing the 2-ethylhexyl diester-amide show less change in elongation with temperature than do the other compositions. Thus, the slope of the elongation-temperature curves (taken as the ratio of elongation at 40° C. to that at 10° C.) is 3 for compositions containing the 2-ethylhexyl diester-amide, 4 for compositions containing di(2-ethylhexyl) phthalate, and 10.9 for compositions containing tricresyl phosphate. In terms of product performance this means that plasticized films containing the 2-ethylhexyl diester-amide will stiffen less in cool weather, and show less increase in extensibility on hot days.

The diester-amides also exert a stabilizing action on vinyl resins containing combined vinyl chloride. They mitigate the deleterious effects which iron pigments normally have on these resins, and they may be used in plastic compositions containing such iron pigments. The diester-amides are also effective plasticizers and stabilizing ingredients in lacquers containing vinyl chloride resins which are to be baked upon iron surfaces.

The diester-amides are non-basic materials, and thus they are to be distinguished from the tri-esters of triethanolamine, which are too basic to serve as plasticizers for vinyl chloride resins, and cause discoloration of such resins on heating. The diester-amides may themselves cause a slight amount of discoloration of vinyl chloride resins, but this is not serious.

The 2-ethylhexyl diester-amide is compatible with a number of vinyl chloride resins over a considerable range, as shown in the table to follow, the compatibilities being determined on film cast from solutions.

| Resin | Ratio of Resin to Plasticizer | | |
|---|---|---|---|
| | 9:1 | 4:1 | 2:1 |
| Vinyl chloride 96%, vinyl acetate 4%, copolymer | C | C | C |
| Vinyl chloride 87%, vinyl acetate 13%, copolymer | C | C | C |
| Vinyl chloride 91%, vinyl alcohol 6%, vinyl acetate 3%, copolymer | C | C | C |
| Vinyl chloride 60%, acrylonitrile 40%, copolymer | C | | |

C=compatible.

The diester-amides derived from the lower fatty acids, such as propionic acid and butyric acid are more compatible with vinyl chloride-acrylonitrile copolymers than is the 2-ethylhexyl diester-amide. The latter compound is, however, highly compatible with polyvinyl chloride as determined by milling tests at 35% plasticizer concentration.

The diester-amides of diethanolamine or diisopropanolamine and fatty acids containing from 3 to 9 carbon atoms may be prepared by heating the dialkylolamine with at least three moles of a fatty acid at temperatures of about 125 to 200° C. The heating is preferably conducted under reduced pressure to assist in the removal of the water of condensation, which amounts to three moles of water per mole of the disalkylolamine. Water may also be removed by carrying out the reaction in the presence of a water-immiscible liquid, such as benzene, toluene, xylene or dibutyl ether, and distilling off the azeotropic mixture of water and said water-immiscible liquid. If desired, the acid chlorides or acid anhydrides may be employed. In the former instance, hydrochloric acid is formed, and this may be swept out of the reaction vessel by purging with an inert gas, such as carbon dioxide or nitrogen. If the acid anhydride is employed, one mole of free fatty acid is formed for each acyl radical introduced into the dialkylolamine. Such free fatty acid may be removed during or after the reaction.

Irrespective of the procedure adopted, at the end of the reaction, it is desirable to strip off all low-boiling material from the diester-amides, which may be recovered as residue products. These products may be purified, if desired, by distilling them in a molecular type still.

The following examples will serve to illustrate the preparation of the plasticizer:

EXAMPLE 1

2,2'(2-ethylhexanamido) diethyl di(2-ethylhexanoate)

105 grams (one mole) of diethanolamine were added slowly to 576 grams (four moles) of 2-ethylhexanoic acid dissolved in 300 cc. of xylene. This mixture was heated to refluxing temperature under a fractionating column having a condenser and decanter for separating the xylene and water, which distilled over as the constant boiling mixture. The xylene was returned to the kettle and the water was collected. This procedure was continued for 10 hours at a kettle temperature not exceeding 170° C. until 53 grams (3 moles) of water had been removed. The xylene and excess organic acid were then removed by stripping at 170° C. and 2 mm. Hg pressure in a Claisen type still. The 2-ethylhexyl diester-amide was then purified by distillation in a molecular still.

The purified diester-amide has the following physical properties:

Specific gravity at 20/20° C_____0.9564
Boiling point at 5 mm. Hg_____255° C.
Vapor pressure at 200° C_____0.6 mm. Hg
Absolute viscosity at 20° C_____139.2 cp.
Refractive index at 20° C. $N_D$____1.4584
Solubility in water at 20° C_____0.01% by weight
Solubility of water in at 20° C___0.5% by weight The same compound was also prepared by mixing 105 grams (1 mole) of diethanolamine with 576 grams (4 moles) of 2-ethylhexanoic acid, and heating the mixture at 150° C. under a pressure of 30 mm. Hg until 53 grams of water were removed. The residue was stripped in a Claisen type still for 2.5 hours at 150° C. and 5 mm. Hg pressure. The final product was a viscous, light-colored liquid.

EXAMPLE 2

2,2' butyramidodiethyl dibutyrate

This compound was prepared by slowly adding 157 grams (1.5 moles) of diethanolamine to 237 grams (1.5 moles) of butyric anhydride accompanied by stirring and cooling to maintain the temperature at 50° C. This mixture was then added to 513 grams (3.25 moles) of butyric anhydride at 125° C., followed by heating of the entire reaction mixture at 140° C. for four hours. The resulting product was stripped in a Claisen type still to remove the free butyric acid. The diester-amide was then purified by distillation in a molecular still, and a light colored viscous liquid was obtained, having a boiling point of 117° C. at 0.05 mm. Hg pressure, a specific gravity of 1.041 at 20/15, and a refractive index $n_D^{28}$ of 1.4540.

EXAMPLE 3

2,2'(2-ethylbutyramido) diethyl di(2-ethylbutyrate)

This compound was prepared by slowly adding 137 grams (1.3 moles) of diethanolamine to 477 grams (4.1 moles) of 2-ethylbutyric acid dissolved in 400 cc. of xylene. The theoretical amount of water (3.9 gram-moles) was removed by azeotropic distillation at a final kettle temperature of 172° C. Xylene and unreacted acid were removed in a Claisen type still, and the diester-amide was distilled in a molecular still. It was obtained as a clear, viscous light-colored liquid, having a specific gravity of 0.988 at 20/15 and a refractive index $n_D^{20}$ of 1.4563.

EXAMPLE 4

2,2' nonanamidodiethyl dinonanoate

This compound was made by slowly adding 497 grams (3.14 moles) of nonanoic acid to 105 grams (1 mole) of diethanolamine dissolved in 400 cc. of xylene. The theoretical amount of water (3 gram-moles) was removed by azeotropic distillation over a period of 12 hours with the kettle temperature maintained at 150 to 173° C. The diester-amide was first stripped in a Claisen type still at 170° C. and 5 mm. Hg pressure, and then distilled in a molecular type stripping still of the falling film type. A light-colored, clear viscous liquid was obtained, having a boiling point of 183° C. at 0.05 mm. Hg a specific gravity at 20/15 of 0.952, and a refractive index $n_D^{20}$ of 1.4605.

EXAMPLE 5

2,2' (2-ethylhexanamido) di-isopropyl di(2-ethylhexanoate)

One mole (133 grams) of di-isopropanolamine was reacted with 576 grams (4.0 moles) of 2-ethylhexanoic acid in the presence of xylene as a water-removing agent in the manner described in the first part of Example 1, the dehydration, however, being somewhat slower. The diester-amide, after purification in a molecular type still had a boiling point of 156° C. at 0.05 mm. Hg, a specific gravity of 0.948 at 20/15, and a refractive index $n_D^{26}$ of 1.4539.

The product was compatible with copolymers of vinyl chloride and vinyl acetate containing about 96% vinyl chloride at 33% concentration of plasticizer by weight of the composition to yield a flexible sheet having a flex temperature of —5.0° C.

The invention is susceptible of modification within the scope of the appended claims.

This application is a division of our copending application Serial No. 666,439, filed May 1, 1946.

We claim:

1. A plastic composition comprising a vinyl resin predominantly composed of vinyl chloride polymerized therein intimately combined with a plasticizer of the structure

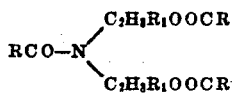

where $R_1$ is a radical of the group consisting of hydrogen and methyl, and R is an alkyl radical containing from 2 to 8 carbon atoms which is identical in all three positions.

2. A plastic composition comprising a vinyl resin predominantly composed of vinyl chloride polymerized therein intimately combined with a plasticizer, the plasticizer being the diester-amide of diethanolamine and a fatty acid of the structure RCOOH, where R is a branched-chain alkyl radical containing from 5 to 7 carbon atoms.

3. A plastic composition comprising a vinyl resin predominantly composed of vinyl chloride polymerized therein intimately combined with a plasticizer, the plasticizer being the diester-amide of diisopropanolamine and a fatty acid of the structure RCOOH, where R is a branched-chain alkyl radical containing from 5 to 7 carbon atoms.

4. A plastic composition comprising a copolymer of vinyl chloride and vinyl acetate containing at least 87% by weight of combined vinyl chloride intimately combined with a plasticizer, the plasticizer being the diester-amide of diethanolamine and 2-ethylhexanoic acid.

5. A plastic composition comprising polyvinyl chloride intimately combined with a plasticizer, the plasticizer being the diester-amide of diethanolamine and 2-ethylhexanoic acid.

FRANKLIN JOHNSTON.
WILLIAM H. HENSLEY.

REFERENCES CITED

The following references are of record in the file of this patent:

UNITED STATES PATENTS

| Number | Name | Date |
|---|---|---|
| 2,143,765 | Dickey | Jan. 10, 1939 |